US011343726B2

(12) United States Patent
Clairgironnet et al.

(10) Patent No.: US 11,343,726 B2
(45) Date of Patent: May 24, 2022

(54) CELL SELECTION AND HANDOVER METHODS

(71) Applicant: Sequans Communications S.A., Colombes (FR)

(72) Inventors: Jean-Marc Clairgironnet, Colombes (FR); Samuli Talvia, Colombes (FR); Jean Margerin, Colombes (FR)

(73) Assignee: Sequans Communications S.A., Colombes (FR)

( * ) Notice: Subject to any disclaimer, the term of this patent is extended or adjusted under 35 U.S.C. 154(b) by 0 days.

(21) Appl. No.: 16/996,651

(22) Filed: Aug. 18, 2020

(65) Prior Publication Data

US 2022/0060949 A1 Feb. 24, 2022

(51) Int. Cl.
*H04W 36/00* (2009.01)
*H04L 5/00* (2006.01)
*H04W 74/08* (2009.01)
*H04B 17/336* (2015.01)
*H04W 56/00* (2009.01)
*H04W 48/00* (2009.01)

(52) U.S. Cl.
CPC ...... *H04W 36/0058* (2018.08); *H04B 17/336* (2015.01); *H04L 5/0055* (2013.01); *H04W 36/00835* (2018.08); *H04W 36/00837* (2018.08); *H04W 48/17* (2013.01); *H04W 56/0045* (2013.01); *H04W 74/0833* (2013.01)

(58) Field of Classification Search
CPC .... H04L 47/283; H04W 4/023; H04W 24/00; H04W 36/04; H04W 36/08; H04W 36/14; H04W 36/20; H04W 36/26; H04W 36/30; H04W 36/36; H04W 48/18; H04W 48/20; H04W 74/0833; H04W 76/10
See application file for complete search history.

(56) References Cited

U.S. PATENT DOCUMENTS

| | | | | |
|---|---|---|---|---|
| 5,959,980 A | * | 9/1999 | Scott | H04J 3/0682 370/280 |
| 9,369,902 B1 | * | 6/2016 | Sandhu | H04W 24/08 |
| 9,929,794 B2 | | 3/2018 | Rowland | |
| 2004/0266474 A1 | * | 12/2004 | Petrus | H04B 17/382 455/525 |
| 2007/0232307 A1 | * | 10/2007 | Ibrahim | H04W 36/00835 455/436 |
| 2008/0219190 A1 | * | 9/2008 | Haartsen | H04W 56/0045 370/280 |
| 2009/0042582 A1 | | 2/2009 | Wang et al. | |
| 2013/0272230 A1 | * | 10/2013 | Dinan | H04B 7/2618 370/329 |

(Continued)

FOREIGN PATENT DOCUMENTS

EP 2 408 253 A1 7/2010

*Primary Examiner* — Kan Yuen
(74) *Attorney, Agent, or Firm* — Hamilton, Brook, Smith & Reynolds, P.C.

(57) ABSTRACT

Embodiments described herein relate to a method of selecting a cell for communication over a network, the method comprising: determining a round trip delay (RTD) measurement from a device to each of a plurality of base stations, each of the plurality of base stations being in a respective one of a plurality of cells; ranking the plurality of cells based at least in part on the RTD measurements; selecting the highest-ranked cell; and initiating attachment to the selected cell.

16 Claims, 5 Drawing Sheets

(56) References Cited

U.S. PATENT DOCUMENTS

| | | | |
|---|---|---|---|
| 2015/0105066 A1* | 4/2015 | Wu | H04W 76/27 |
| | | | 455/423 |
| 2015/0131483 A1* | 5/2015 | Colban | H04W 48/20 |
| | | | 370/254 |
| 2015/0327017 A1* | 11/2015 | Beauregard | G01S 5/02 |
| | | | 455/456.6 |
| 2015/0334769 A1* | 11/2015 | Kim | H04L 1/18 |
| | | | 370/329 |
| 2016/0192270 A1* | 6/2016 | Xu | H04W 24/08 |
| | | | 370/331 |
| 2017/0126480 A1* | 5/2017 | Youtz | H04W 74/0833 |
| 2020/0186236 A1* | 6/2020 | Wang | H04W 84/06 |
| 2020/0187073 A1* | 6/2020 | Ma | H04W 36/30 |
| 2020/0229126 A1* | 7/2020 | Soriaga | H04L 5/0062 |
| 2021/0014900 A1* | 1/2021 | Lei | H04W 52/282 |
| 2021/0029658 A1* | 1/2021 | Mahalingam | H04B 7/18513 |
| 2021/0112618 A1* | 4/2021 | Jeon | H04W 76/18 |

\* cited by examiner

CELL SELECTION AND HANDOVER METHODS

FIELD

The present disclosure relates to a method of selecting a cell for communication over a network, and a method of handing over a user equipment (UE) from a first cell in a communications network to a second cell in the network.

BACKGROUND

In air-to-ground (A2G) communications, a user equipment (UE) device in an aircraft uses the Physical Random Access Channel (PRACH) to connect to a network. However, the cells used for A2G communication are much larger than in terrestrial cellular networks. To address this, the UE transmits a sequence of PRACH preambles at different timing advance offsets and listens for a response from an eNodeB in a cell. For example, a UE transmits a sequence of PRACH format 0 preambles, which have a maximum distance of 14.5 km. (PRACH format 1 preambles are not supported by most eNodeB vendors, and PRACH format 2 and 3 preambles cannot be used for large cells because these preambles use two copies of the same sequence, which an eNodeB may be unable to distinguish between).

Therefore, to cover a distance of 200 km (for example), the UE needs to send the PRACH format 0 preamble fourteen times with different timing advance offsets. In this example, the UE could use timing advance offsets for distances of 0 km, 14.3 km, 28.6 km, etc., up to 185.7 km. The timing advance values are calculated as the time taken for the signal to travel these distances. Therefore, the UE transmits the preambles in this example with timing advance offsets of 619 µs (for 185.7 km), 571 µs (for 171.4 km), and so on, including 48 µs (for 14.3 km) and 0 µs (for 0 km).

Often, a UE receives reference signals from a number of eNodeBs. In accordance with the 3GPP LTE standard, the UE initiates an attachment procedure to the eNodeB with the highest reference signal received power (RSRP). However, the 3GPP LTE standard does not account for cells situated at large distances from the UE, and does not recognise that some cells may be out of range of the UE modem. There is a risk that the eNodeB with the highest RSRP is out of range of the UE modem. This can occur in A2G communications as the signal path between the eNodeB and the UE in the aircraft is substantially unimpeded (when compared to ground-based communications, for example). The magnitude of the RSRP can depend on a number of factors, including the orientation of the aircraft. There is also a risk that the eNodeB with the highest RSRP is within range of the UE modem but has a much larger round trip delay (RTD) compared to other cells that are within range of the UE modem.

These risks are not limited to A2G communications, and can occur in any network environment in which the distance from the UE to the cells is large. For example, these risks can occur in any network environment where the cell spacing is greater than the PRACH limit.

If the UE attempts to attach to a cell that is out of range of the UE modem, it will be unable to attach to the cell. This is because the sequence of PRACH preambles would not cover the distance to the out-of-range eNodeB. The UE would therefore cycle through all timing offset values in the sequence without receiving a response from the eNodeB. This means that the modem can be stuck for several minutes while attempting an unsuccessful attachment procedure.

If the UE attempts to attach to a cell within range of the UE modem but with a larger RTD than other cells within range of the modem, then the UE may suffer suboptimal performance. A high RTD from the UE to the eNodeB in the cell will result in poor network performance for the UE.

Another issue in A2G communications is that the detection algorithm used by the eNodeB can result in incorrect evaluation of the timing advance value in the preamble transmitted by the UE. If the eNodeB receives a preamble from the UE, it sends a response in the form of a Random Access Response (RAR) message to the UE. The RAR includes timing information for uplink communication from the UE to the eNodeB. If the eNodeB incorrectly evaluates the timing advance values (and therefore the distance from the eNodeB to the UE), the timing information in the RAR message will be incorrect. In other words, the RAR message with the incorrect timing information can be described as a "false RAR message". The UE modem uses the incorrect timing information in the false RAR message from the eNodeB to determine the transmission time of the Radio Resource Control (RRC) connection request. Given that the timing offset used by the UE to transmit the RRC connection request is incorrect, the eNodeB never receives the RRC connection request properly. Therefore, the UE does not receive an acknowledgement of the RRC connection request from the eNodeB. This means that the attachment procedure fails. In line with the 3GPP LTE standard, if the modem fails to attach after a RAR message has been received, the modem re-attempts to attach to the cell using the same timing advance value, until timeout of the T300 timer. Again, this means that the modem can get stuck for several minutes during the attachment procedure if the timing advance offsets are incorrectly evaluated by the eNodeB.

These issues are not limited to the initial attachment procedure, and can also occur during handover from one cell to another. For example, the network may switch the UE from a first cell to a second cell that is out of range of the modem. If this occurs, then the modem will be unable to attach to the second cell, as described above.

Existing solutions have no protection against cells that are out of range, meaning that the UE modem can be stuck for several minutes.

Accordingly, there exists a need for optimising the network connection procedure in A2G communications. Specifically, there is a need to reduce the amount of time taken for a UE to connect to a network.

SUMMARY

This summary introduces concepts that are described in more detail in the detailed description. It should not be used to identify essential features of the claimed subject matter, nor to limit the scope of the claimed subject matter.

According to one aspect of the present disclosure, there is provided a method of selecting a cell as defined in claim 1. According to another aspect of the present disclosure, there is provided a method of handover of a user equipment (UE) device as defined in claim 13. According to a further aspect of the present disclosure, there is provided a non-transitory computer-readable medium as defined in claim 19. According to a further aspect of the present disclosure, there is provided a non-transitory computer-readable medium as defined in claim 20.

Set out below are a series of numbered clauses that disclose features of further aspects, which may be claimed. The clauses that refer to one or more preceding clauses contain optional features.

1. A method of selecting a cell for communication over a network, the method comprising:
    determining a round trip delay (RTD) measurement from a device to each of a plurality of base stations, each of the plurality of base stations being in a respective one of a plurality of cells;
    ranking the plurality of cells based at least in part on the RTD measurements;
    selecting the highest-ranked cell; and
    initiating attachment to the selected cell.

2. A method according to clause 1, wherein the distance from the device to each of the plurality of base stations exceeds a maximum distance associated with a PRACH preamble.

3. A method according to clause 1 or clause 2, further comprising:
    determining whether the selected cell is an initial cell to which the device is attached; and
    remaining attached to the initial cell if the selected cell is the initial cell.

4. A method according to any of clauses 1 to 3, wherein the cells are ranked based at least in part on measurements of the received power of reference signals transmitted by the plurality of base stations.

5. A method according to any of clauses 1 to 4, wherein the cells are ranked based at least in part on measurements of the signal-to-noise ratio or carrier to interference plus noise ratio of reference signals transmitted by the plurality of base stations.

6. A method according to any of clauses 1 to 5, further comprising initiating attachment to an initial cell of the plurality of cells prior to determining the RTD from the device to the plurality of base stations.

7. A method according to clause 6, wherein initiating attachment to the initial cell comprises:
    transmitting a first preamble from the device to the base station in the initial cell, wherein the first preamble is transmitted with a first timing advance offset; and
    storing the first timing advance offset.

8. A method according to clause 7, further comprising:
    determining whether a response is received at the device from the base station in the initial cell;
    transmitting a connection request to the base station in the initial cell if a response is received from the base station in the initial cell;
    determining whether an acknowledgement of the connection request is received at the device from the base station in the initial cell; and
    if it is determined that no acknowledgement of the connection request is received at the device from the base station in the initial cell, transmitting a second preamble from the device to the base station in the initial cell, wherein the second preamble is transmitted with a second timing advance offset based on the stored timing advance offset.

9. A method according to clause 8, wherein the first timing advance offset and the second timing advance offset are each part of a sequence of timing advance offsets, wherein the second timing advance offset is subsequent to the first timing advance offset in the sequence of timing advance offsets.

10. A method according to any of clauses 6 to 9, further comprising:
    determining that the device has not attached to the initial cell; and
    incrementing a fail counter for the initial cell.

11. A method according to clause 10, wherein determining that the device has not attached to the initial cell comprises:
    determining that preambles corresponding to a range of a modem of the device have been transmitted from the device to the base station in the initial cell; and/or
    determining that an acknowledgement of a connection request transmitted from the device to the base station in the initial cell has not been received at the device.

12. A method according to clause 10 or clause 11, further comprising:
    determining that the fail counter for the initial cell is not less than the failure threshold; and
    blocking the initial cell for a predetermined time period.

13. A method of handover of a user equipment (UE) device from a first cell in a communications network to a second cell in the network, the method comprising:
    determining a round trip delay (RTD) measurement from the device to each of a plurality of base stations, each of the plurality of base stations being in a respective one of a plurality of cells;
    ranking the plurality of cells based at least in part on the RTD measurements;
    selecting the highest-ranked cell; and
    reporting details of the selected cell to the network.

14. A method according to clause 13, further comprising:
    removing a cell from a list of available cells if the RTD measurement from the device to the respective base station in the cell exceeds the range of a modem of the device;
    wherein ranking the plurality of cells comprises ranking the list of available cells.

15. A method according to clause 13 or clause 14, wherein the distance from the device to each of the plurality of base stations exceeds a maximum distance associated with a PRACH preamble.

16. A method according to any of clauses 13 to 15, wherein the cells are ranked based at least in part on:
    measurements of the received power of reference signals transmitted by the plurality of base stations; and/or
    measurements of the signal-to-noise ratio of reference signals transmitted by the plurality of base stations; and/or
    measurements of the carrier to interference plus noise ratio of reference signals transmitted by the plurality of base stations.

17. A method according to any of clauses 13 to 16, further comprising initiating attachment to the selected cell by transmitting a preamble from the device to the selected cell, wherein the preamble is transmitted with a timing advance offset based on the determined RTD measurement from the device to the base station in the selected cell.

18. A method according to any of clauses 13 to 17, further comprising blocking the reporting of details of cells ranked below the highest-ranked cell to the network.

19. A non-transitory computer-readable medium comprising instructions that, when executed by a processor of a device, cause the device to perform a method according to any of clauses 1 to 12.

20. A non-transitory computer-readable medium comprising instructions that, when executed by a processor of a device, cause the device to perform a method according to any of clauses 13 to 18.

BRIEF DESCRIPTION OF FIGURES

Specific embodiments are described below by way of example only and with reference to the accompanying drawings, in which.

DETAILED DESCRIPTION

Figure 1:
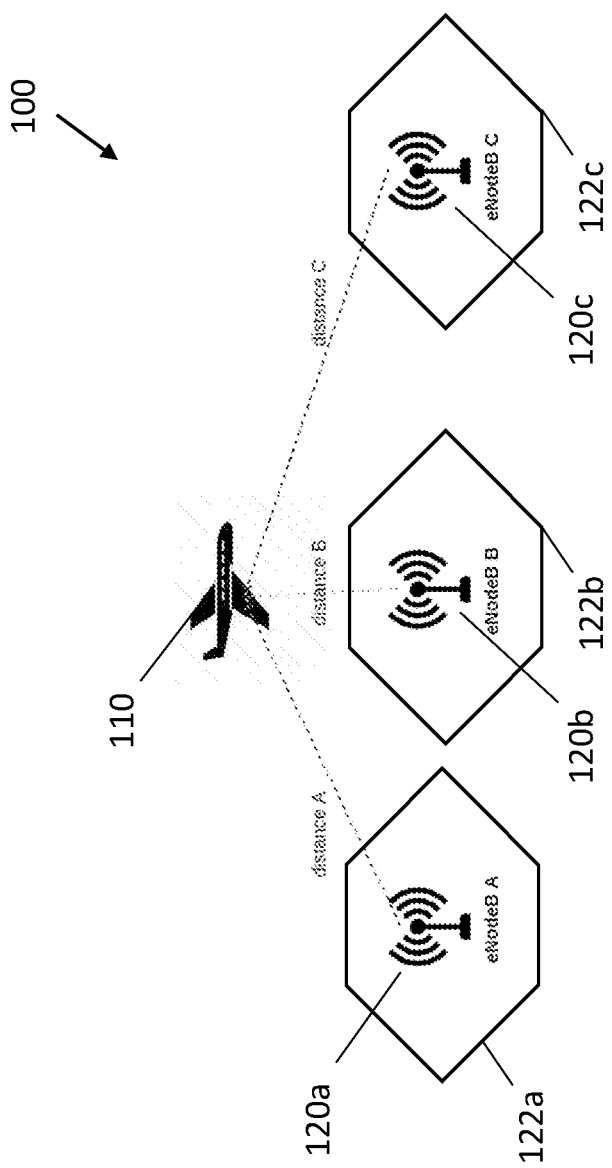
FIG. 1 is a schematic diagram of a network environment.

Implementations of the present disclosure are explained below with particular reference to an initial attachment procedure for a UE connecting to a network in A2G communications. However, as explained further below, the implementations described herein are also applicable to the handover of a UE from one cell to another in A2G communications. In addition, the implementations described herein are not limited to A2G communications, but can be applied to any network environment in which a UE is located at a large distance from a base station. Such network environments include satellite communications, communications at sea, and communications in areas of low population density in which base stations are located at large distances from one another. The term "large distance" (as used herein) may be interpreted as any distance greater than the maximum distance of the PRACH preambles used for attachment to the cell (for example, greater than 14.5 km for PRACH format 0 preambles). "Attachment to a cell" (as used herein) may be interpreted as establishing a connection to a base station in the cell for the purpose of data communication between a device and the base station.

The present disclosure defines a fail counter for an attachment procedure, whereby a cell is barred for a period of time after the number of unsuccessful attachment attempts reaches a failure threshold. For example, if the UE attempts to attach to a cell that is out of range, or if a connection request is incorrectly evaluated by a base station in a cell, the number of unsuccessful attachment attempts for that cell is capped at the failure threshold value. This means that the UE can then attempt to attach to a different cell. Using the fail counter in the attachment procedure means that a UE modem does not get stuck for several minutes while attempting to attach to a cell. This is because the UE attempts to attach to a different cell if the number of unsuccessful attempts to attach to a first cell reaches the failure threshold. Consequently, the time taken for the UE to connect to the network is reduced.

The present disclosure also defines a method in which timing offset values are stored. Once a UE determines that a false RAR message has been received from the eNodeB, it transmits the next preamble using a timing offset value that is based on a timing offset value that was stored prior to receipt of the false RAR message (instead of restarting the attachment procedure). Again, this means that the time taken for the UE to connect to the network is reduced, because the attachment procedure does not restart.

In addition, the present disclosure defines a method in which a UE determines an optimal cell to attach to, once it has attached to an initial cell. The optimal cell is a cell having the best rank of all cells, where the ranking of the cells takes into account the round trip delay (RTD) from the UE to base stations in the cells, in addition to one or more of the RSRP and the signal-to-noise ratio (SNR) or Carrier to Interference plus Noise Ratio (CINR) of the signals received from the base stations. By attaching to the cell with the best rank, a UE is provided with improved network performance.

FIG. 1 is a schematic diagram of a network environment 100. An aircraft 110 detects periodic reference signals transmitted by a number of base stations on the ground (shown in FIG. 1 as eNodeB A 120a, eNodeB B 120b and eNodeB C 120c). Each eNodeB 120a, 120b, 120c manages radio resources in its corresponding cell 122a, 122b, 122c.

Figure 2:
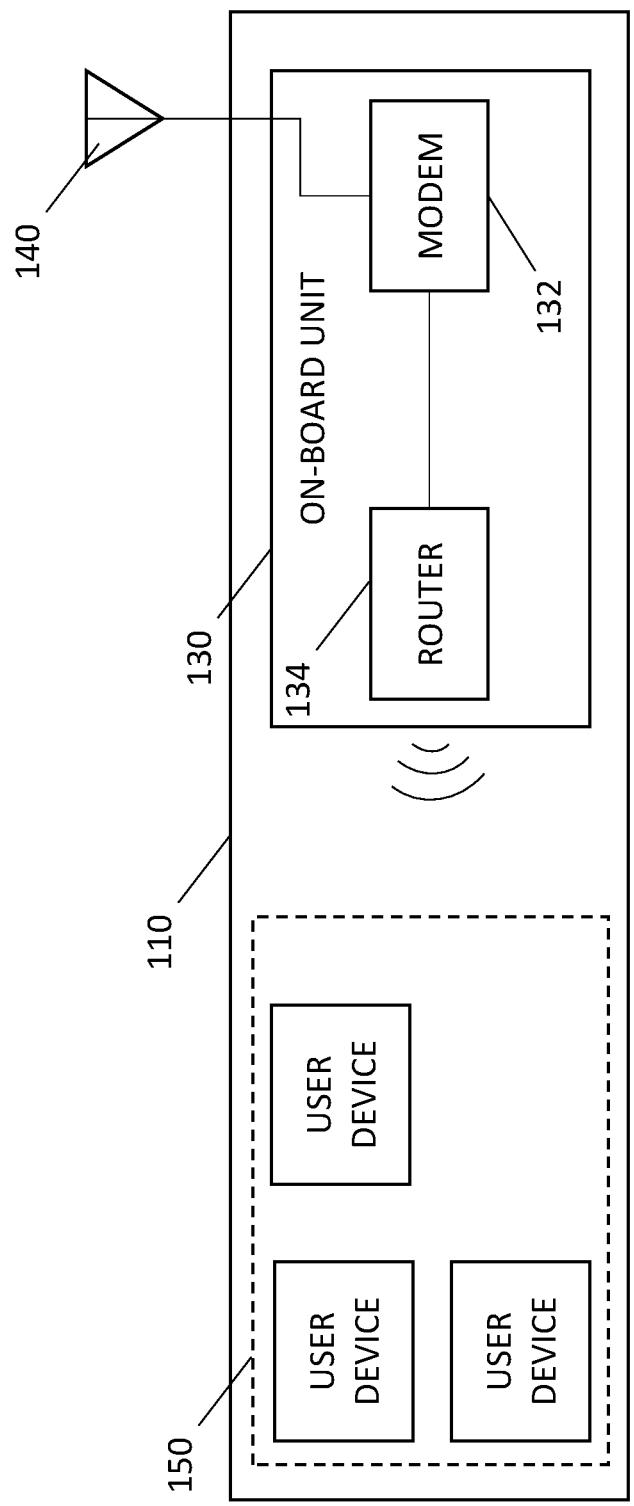
FIG. 2 is a schematic diagram of an aircraft in the network environment of FIG. 1.

The reference signals are detected at a modem of a user equipment (UE) (not shown in FIG. 1) located on board the aircraft 110. For example, the reference signals may be detected at a modem 132 of an on-board unit 130 in the aircraft 110, as shown in FIG. 2. In the example shown in FIG. 2, the modem 132 communicates with the eNodeBs 120 via one or more antennas 140 on the aircraft 110. The on-board unit 130 also includes a router 134, which provides a WiFi signal to user devices 150 on the aircraft 110. In other examples, the modem of a mobile device used by a user on board the aircraft 110 may communicate directly with the eNodeBs 120.

The modem 132 detects periodic reference signals from each of the eNodeBs 120a, 120b, 120c. However, the modem 132 has limited information about the eNodeBs 120. For example, the modem 132 does not know the distance to each eNodeB 120. The modem 132 can detect the received power of the reference signals from the eNodeBs 120 (i.e. the reference signal received power, RSRP). However, the modem 132 does not know whether the eNodeB 120 with the highest RSRP is within range of the modem 132.

To attach to one of the cells 122, the modem 132 transmits preambles (such as PRACH format 0 preambles) at different timing offset values. As the distance to an eNodeB 120 is unknown, the modem 132 starts by transmitting a preamble with an initial timing offset value. The modem 132 then transmits preambles with a different timing offset value, if no response is received from the eNodeB 120. The preambles are transmitted according to a sequence of timing offset values.

As an example, the initial timing offset value may correspond to the midpoint of the modem's range (e.g. a timing offset value of 250 ps corresponding to a midpoint of 75 km of a modem range of 150 km). If no response is received from the eNodeB 120, the modem 132 transmits the preamble with a different timing offset value. For example, the modem 132 may transmit the preamble with a second timing offset value that is lower than the initial timing offset value. Then, if no response is received, the modem 132 may subsequently transmit the preamble with a third timing offset value that is higher than the initial timing offset value. If no response is received, the modem 132 may continue the pattern of transmitting preambles with increasing offsets from the initial offset. That is, the modem 132 may transmit the preamble with a fourth timing offset value that is lower than the second timing offset value and, if no response is received, the modem 132 may subsequently transmit the preamble with a fifth timing offset value that is higher than the third timing offset value. As explained above, the gap between timing offsets is determined by the number of preamble transmissions required to cover the maximum range of the modem 132. It will be appreciated that the sequence of transmitting the preambles with timing offsets is not limited to the example given above, and that different timing offset sequences may be implemented.

FIG. 2 is a schematic diagram of the aircraft 110, including the on-board unit 130, antennas 140 and user devices 150 according to one example. As shown in the example of FIG. 2, the on-board unit 130 comprises the modem 132 and the router 134.

Figure 3:
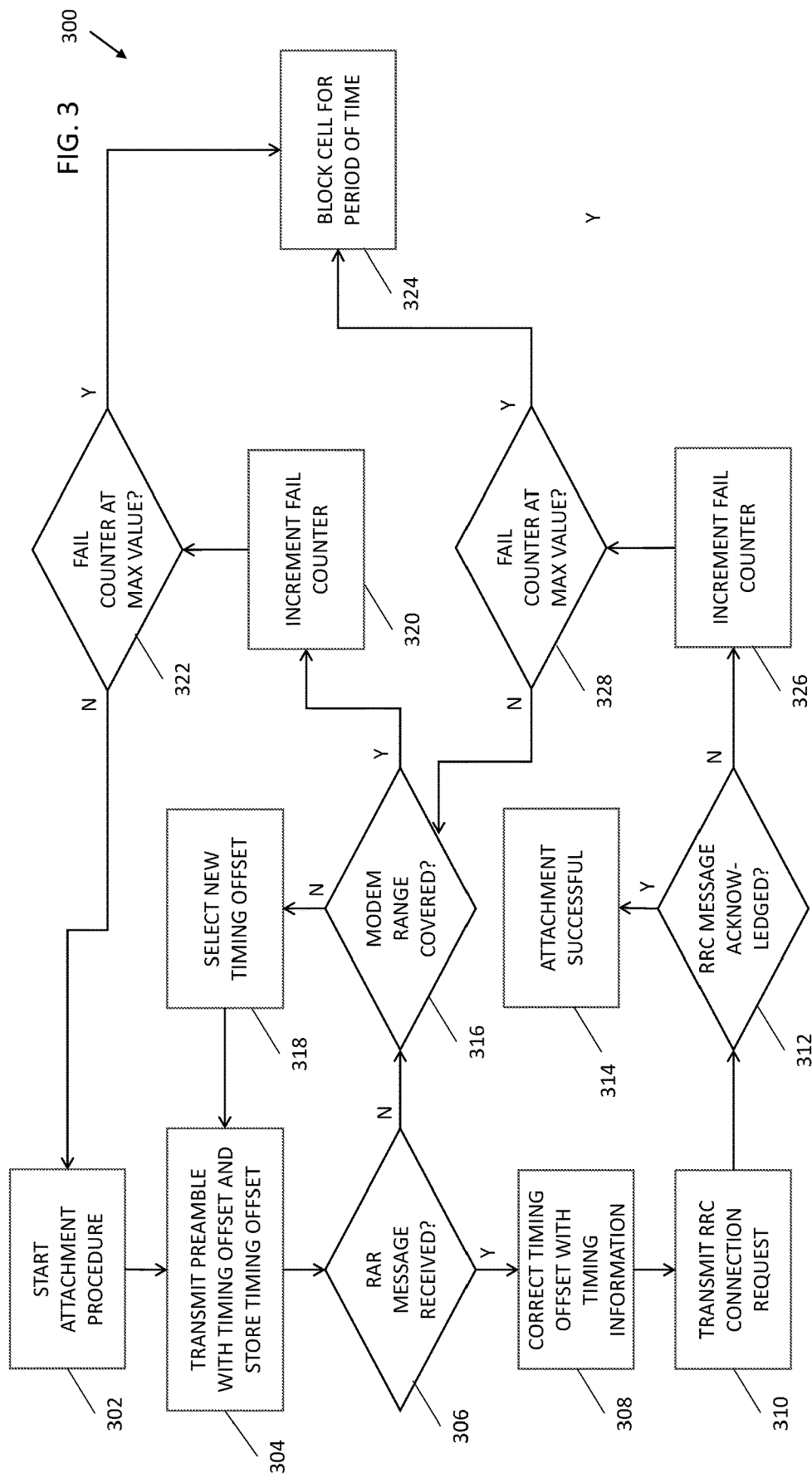
FIG. 3 is a flowchart of a method of attaching to a cell.

FIG. 3 is a flowchart of a method 300 of attaching to a cell. The method 300 may be implemented by a device (e.g. a UE). For example, the method 300 may be implemented by a modem of a UE. At 302, the modem starts the attachment procedure by scanning to detect available cells and measuring the RSRP and CINR from corresponding base stations (e.g. eNodeBs) in the available cells, along with the relative timings of the reference signals transmitted by the base stations. At 304, the modem transmits a preamble to an eNodeB. The preamble is transmitted with a timing offset value selected according to the sequence of timing offset values being implemented. Initially, the preamble may be transmitted using a timing offset value based on the path loss measured by the modem (i.e. the path loss of the reference signals transmitted by the eNodeBs). The modem also stores the timing offset value used to transmit the preamble at 304.

At 306, the modem detects whether a RAR message is received from the eNodeB. If a RAR message is received from the eNodeB, the modem corrects the timing offset used for subsequent transmissions using the timing information in the RAR message, at 308. The modem then transmits to the eNodeB, at 310, a RRC connection request with the corrected timing offset.

At 312, the modem detects whether the RRC connection request is acknowledged by the eNodeB. If the RRC connection request is acknowledged, the attach procedure is successful, and the method ends at 314.

If no RAR message is received at 306, then the modem determines at 316 whether preambles have been transmitted with all of the timing offset values required to cover the maximum range of the modem. If not all of the timing offset values have been used, then the modem selects, at 318, a new timing offset value based on the previous timing offset value that was used. For example, the modem may select the subsequent timing offset value in the timing offset sequence used for transmission of the preambles. The method then loops back to 304, where the modem sends the preamble with the selected timing offset value, and stores the timing offset value used to send the preamble.

If the modem determines at 316 that preambles have been transmitted with all of the timing offset values required to cover the maximum range of the modem, then the modem increments at 320 a fail counter for the cell to which it is attempting to attach. The modem then determines at 322 whether the fail counter has reached a maximum value (i.e. a failure threshold).

If the modem determines at 322 that the fail counter is less than the failure threshold, then the method proceeds to 302, where the attachment procedure restarts.

If the modem determines at 322 that the fail counter has reached the failure threshold, then, at 324, the modem blocks the cell for a period of time (e.g. five minutes). The modem may then attempt to attach to a different cell (if one is available).

If the modem can still detect the cell that was blocked at 324 after expiry of the time period, it can re-attempt attachment to that cell.

If no acknowledgement of the RRC connection request is received at 312, then the RAR message received from the eNodeB contained incorrect timing information (in other words, that the RAR message received from the eNodeB was a "false RAR message"). The modem then increments at 326 the fail counter for the cell to which it is attempting to attach. The modem then determines at 328 whether the fail counter has reached the maximum value (i.e. the failure threshold).

If the modem determines at 328 that the fail counter is less than the failure threshold, then the modem determines at 316 whether preambles have been transmitted with all timing offset values to cover the modem range and, if so, selects at 318 a new timing offset based on the stored timing offset value. For example, the modem may select the timing offset value that is subsequent to the stored timing offset value in a timing offset sequence. The method then loops back to 304, where the modem sends the preamble with the selected timing offset value. A preamble is therefore transmitted using a timing offset value based on the timing offset value that was stored prior to receipt of the RAR message.

By transmitting a preamble using a timing offset value based on the timing offset value that was stored prior to receipt of the RAR message, the number of preamble transmissions is minimised. This optimises the PRACH procedure to avoid T300 timeout (which would stop the attachment procedure and cause further delays for connection to the network).

If the modem determines at 328 that the fail counter has reached the failure threshold, then the method proceeds to 324, where the modem blocks the cell for a period of time.

Figure 4:
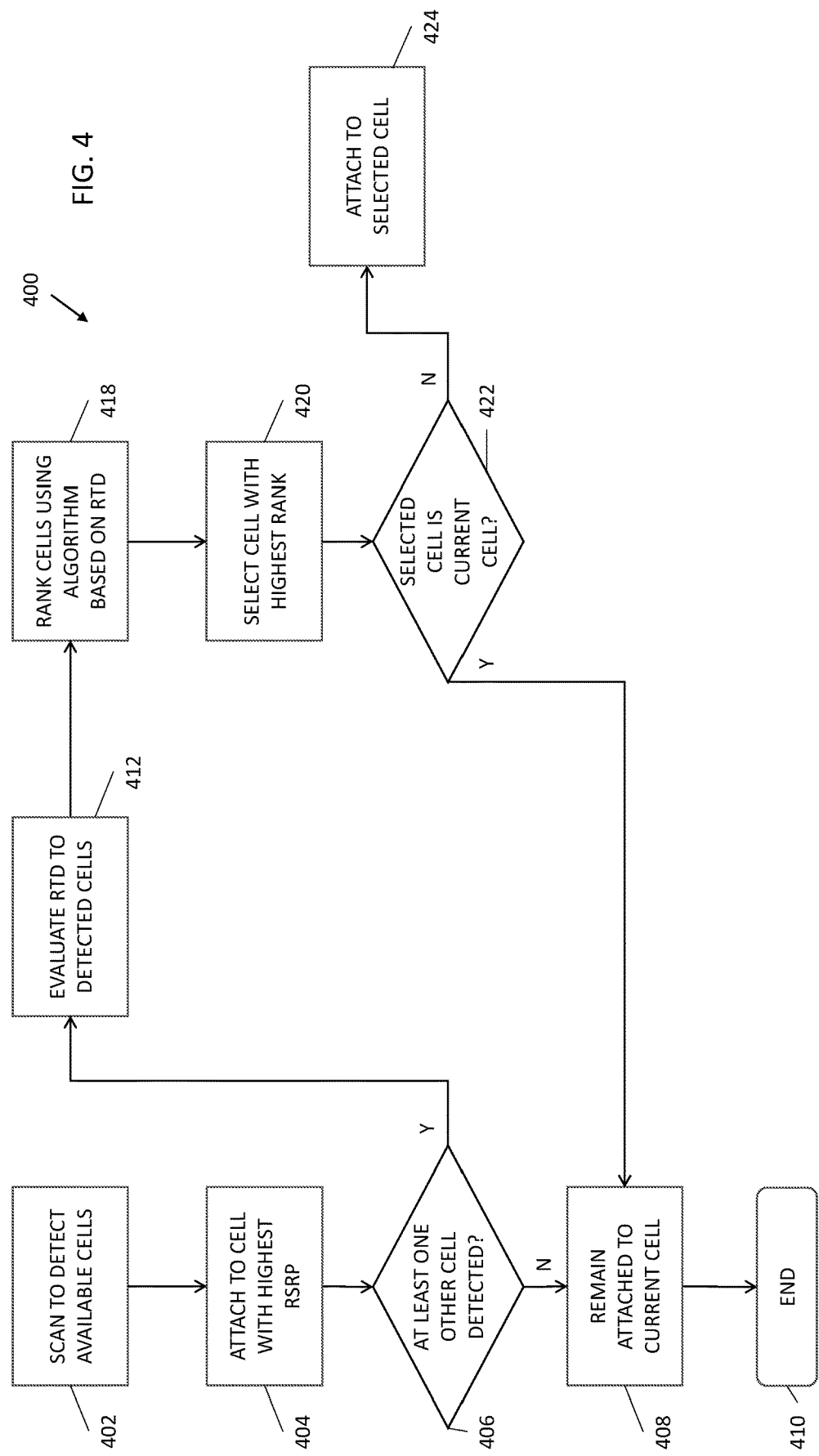
FIG. 4 is a flowchart of a method of determining an optimal cell for connection to a network.

FIG. 4 is a flowchart of a method 400 of determining an optimal cell for connection to the network. The method 400 may be implemented by a device (e.g. a UE). For example, the method 400 may be implemented by a modem of a UE.

At 402, the modem scans to detect available cells to which it can attempt to attach. To do this, the modem listens for the reference signals transmitted by base stations (e.g. eNodeBs) that manage radio resources in the cells on the ground. The modem also measures the received power of the reference signals, in order to determine the RSRP for each cell, the SNR and/or CINR of the reference signals, and the relative timings of the reference signals transmitted by the corresponding base station in each cell.

At 404, the modem attempts to attach to the cell with the highest RSRP. For example, the modem may carry out an attachment procedure according to method 300 shown in FIG. 3.

Once the modem has attached to the cell at 404, the modem determines at 406 whether it has detected at least one other cell (i.e. in addition to the cell to which it is currently attached). If the modem determines at 406 that it has not detected at least one other cell (i.e. the modem has only detected the current cell), the modem remains attached to the current cell, at 408, and the method ends, at 410.

If the modem determines at 406 that it has detected at least one other cell, then the modem evaluates, at 412, the round trip delay (RTD) to the base stations in all of the detected cells (i.e. including the current cell). For example, the modem may evaluate the RTD to a particular cell by summing the RTD to the base station in the current cell and the relative timing between the reference signal transmitted by the base station in the current cell and the reference signal transmitted by the base station in that particular cell.

The modem then ranks at 418 the cells using an algorithm that takes into account the RTD to the corresponding base station in each cell, in addition to the RSRP and/or the SNR of the reference signals. For example, the cells may be ranked at 418 according to the following algorithm:

Firstly, the cells are divided into three lists. Any cells that are out of range of the UE modem are placed into a first list. Any cells that are within the range of the UE modem but for which the RTD from the UE to the base station in the cell is higher than a RTD threshold are placed into a second list. All other cells (i.e. the cells for which the RTD from the UE to the base station in the cell is less than the RTD threshold) are placed into a third list.

The cells in the first list are not considered suitable because they are out of range of the UE modem. The UE is not allowed to try to connect to the cells in the first list.

The second list includes cells that will result in poor network performance for the UE due to insufficient time for data to be processed at the UE. For example, a UE may be required to send an acknowledgement to a base station within 4 ms of receiving a data packet. The UE may require 3.2 ms (for example) in order to determine that the data packet has been correctly received, meaning that the RTD from the UE to the base station would need to be less than 0.8 ms. If the UE does not send the acknowledgement in time, then the data packet will be retransmitted by the base station. This means that each base station would be transmitted twice from the base station to the UE, leading to poor network performance. Cells in the second list are only selected only if no cell is present in the third list.

For example, Table 1 shows RTD, RSRP and CINR measurements for cells detected by the UE:

TABLE 1

| Cell number | RTD in µs | RSRP in dBm | CINR in dB |
|---|---|---|---|
| 1 | 1100 | −96 | −5 |
| 2 | 900 | −92 | 7 |
| 3 | 800 | −90 | 2 |
| 4 | 750 | −87 | 5 |
| 5 | 500 | −85 | 16 |
| 6 | 300 | −82 | 10 |

Table 2 shows the result of the sorting based on a maximum range of the modem of 1000 ρs and a performance threshold of 800 ρs:

TABLE 2

| $1^{st}$ list | $2^{nd}$ list | $3^{rd}$ list |
|---|---|---|
| Cell #1 | Cell #2 | Cell #4 |
|  | Cell #3 | Cell #5 |
|  |  | Cell #6 |

As a second step, the cells within each list are sorted based on the RSRP and the CINR measurements. For example, the cells in each list may be sorted in descending order based on the formula: RSRP+CINR. The result of the sorting is shown in Table 3:

TABLE 3

| $1^{st}$ list | | $2^{nd}$ list | | $3^{rd}$ list | |
|---|---|---|---|---|---|
| Cell #1 | −101 | Cell #2 | −85 | Cell #5 | −69 |
|  |  | Cell #3 | −88 | Cell #6 | −72 |
|  |  |  |  | Cell #4 | −82 |

As a third step, the effect of the RTD to the base stations in the cells is converted to a dB offset. This step reduces the risk of the UE attaching to a cell with a high RSRP measurement that is further away than a cell with a slightly lower RSRP measurement (which would give better performance). For the second and third lists, the lowest RTD measurement is used as a reference RTD measurement (in this case, the RTD measurement for cell #6). A dB offset for each cell in the second and third lists is then calculated using the following formula:

$$-3\ dB \times (RTD\_cell - RTD\_ref)/RTD\_ref$$

where RTD_cell is the RTD measurement for that cell, and RTD_ref is the reference RTD measurement.

For example, for cell #2 (RTD of 900 µs), the dB offset will be −6 dB, because the closer cell #6 is used for the reference RTD of 300 µs. The dB offsets are shown in Table 4:

TABLE 4

| $1^{st}$ list | | $2^{nd}$ list | | $3^{rd}$ list | |
|---|---|---|---|---|---|
| Cell #1 | 0 | Cell #2 | −6 | Cell #5 | −2 |
|  |  | Cell #3 | −5 | Cell #6 | 0 |
|  |  |  |  | Cell #4 | −4.5 |

Table 5 shows the final result given by summing the values in Table 3 with the dB offsets in Table 4:

TABLE 5

| $1^{st}$ list | | $2^{nd}$ list | | $3^{rd}$ list | |
|---|---|---|---|---|---|
| Cell #1 | −101 | Cell #2 | −94 | Cell #5 | −71 |
|  |  | Cell #3 | −96 | Cell #6 | −72 |
|  |  |  |  | Cell #4 | −87 |

The final ranking of cells is obtained by putting the cells in the second list after those in the third list, as shown in Table 6:

TABLE 6

| Rank | Cell |
|---|---|
| #1 | Cell #6 |
| #2 | Cell #5 |
| #3 | Cell #4 |
| #4 | Cell #2 |
| #5 | Cell #3 |

It will be appreciated that the above algorithm sets out a specific method of ranking the cells. Other methods of ranking the cells are contemplated and will be apparent to the skilled person. For example, the sorting carried out at the second step may be based solely on RSRP, or on a combination of RSRP, SNR and/or CINR. Weighting factors may also be applied to each of the terms in the formula used in the second step. As another example, the second step may be omitted and the cells may be ranked solely based on the dB offsets corresponding to the RTD measurements. The formula used at the third step may also use a different dB weighting (instead of the 3 dB weighting given above). As a further example, the step of computing the dB offsets may be omitted and the cells may be ranked solely on the RTD measurements.

The modem then selects the cell with the highest rank, at 420. The modem then determines, at 422, whether the selected cell is the cell to which the modem is currently attached. If so, the method proceeds to 408, where the modem remains attached to the current cell, and the method ends at 410.

If the modem determines at 422 that the selected cell is not the current cell, then the modem attaches, at 424, to the selected cell. Given that the modem knows the RTD (and, therefore, the distance) to the selected cell, the modem can compute the timing offset value required for attachment to the selected cell. Therefore, the modem does not need to transmit a sequence of timing offset values when attempting to attach to the selected cell.

At 424, the modem may also determine whether it has successfully attached to the selected cell. If the modem determines that it has not successfully attached, then the modem determines whether there are any other cells in the list of cells ranked at 418 and attempts to attach to the next-highest ranked cell (unless the next-highest ranked cell is the current cell).

Figure 5:
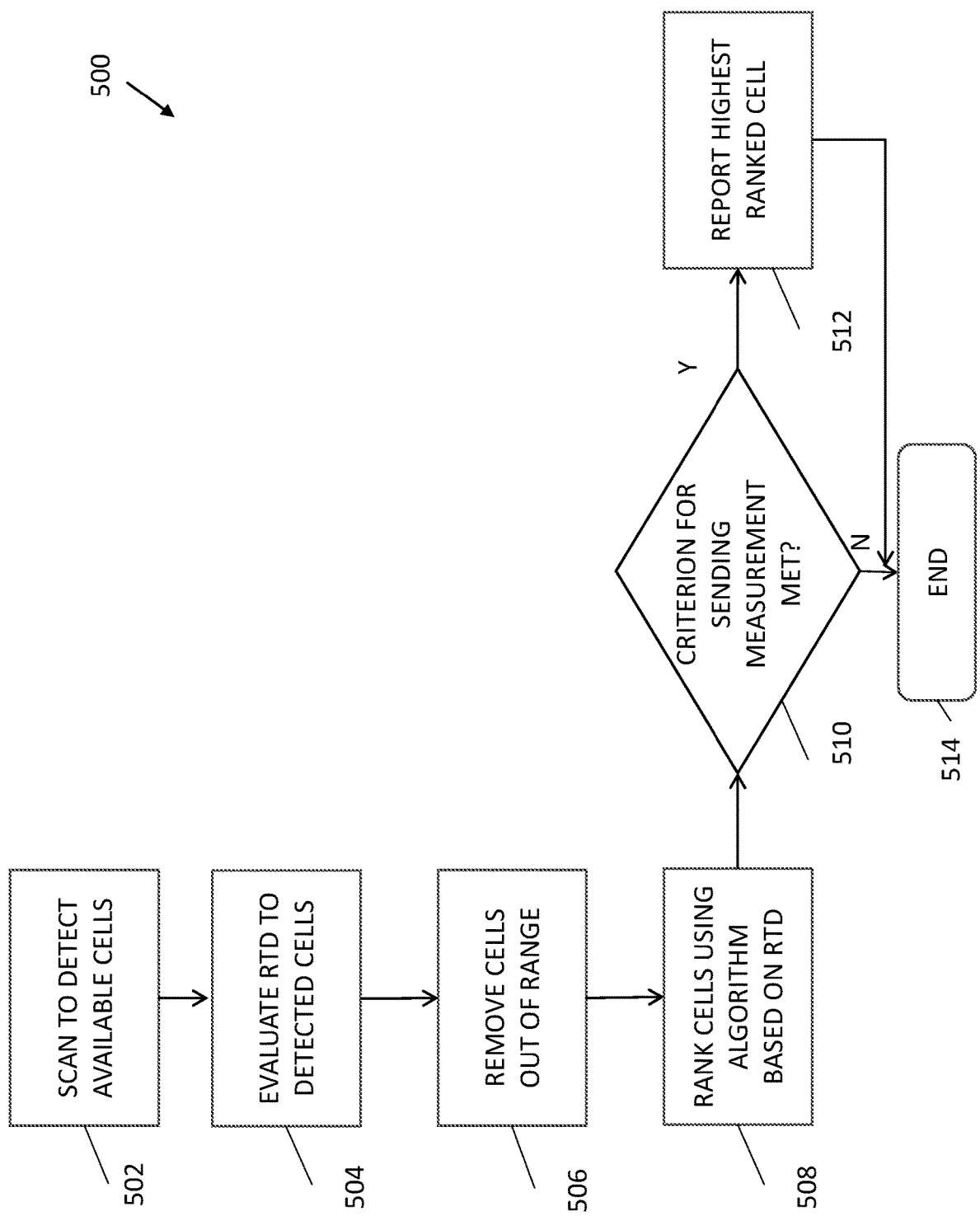
FIG. 5 is a flowchart of a method of optimising handover of a UE from a first cell to a second cell.

FIG. 5 is a flowchart of a method 500 of optimising handover of a UE from a first cell to a second cell. The method 300 may be implemented by a device (e.g. a UE). For example, the method 300 may be implemented by a modem of a UE attached to the first cell.

At 502, the modem scans to detect available cells to which it can attempt to attach. To do this, the modem listens for the reference signals transmitted by base stations that manage radio resources in corresponding cells on the ground. The modem also measures the received power of the reference signals, in order to determine the RSRP for each cell, the CINR of the reference signals, and the relative timings of the reference signals transmitted by the corresponding base station in each cell.

At 504, the modem evaluates the round trip delay (RTD) to the base stations in all of the detected cells (i.e. including the current cell). For example, the modem may evaluate the RTD to a particular cell by summing the RTD to the base station in the current cell and the relative timing between the reference signal transmitted by the base station in the current cell and the reference signal transmitted by the base station in that particular cell.

At 506, the modem removes from a list of available cells any cells for which the RTD from the modem to the base station is beyond the range of the modem.

The modem then ranks at 508 the list of available cells using an algorithm that takes into account the RTD to the corresponding base station in each cell, in addition to the RSRP and/or the CINR of the reference signals. For example, the cells may be ranked at using the algorithm set out at 418 above.

At 510, the modem selects the highest ranked cell and determines whether the highest ranked cell at 508 meets the 3GPP criterion for sending a RSRP measurement to the network (e.g. to the eNodeB in the current cell).

If the criterion is met, the modem reports details of the highest ranked cell (such as the RSRP measurement for the highest ranked cell) to the network at 512, and the method ends, at 514. This allows the network to initiate handover of the UE from the first cell to the highest ranked cell. The modem may also block the reporting of details of all other cells (i.e. the lower ranked cells). If any cells are out of range of the modem, details of these cells are not reported to the network at 512. Therefore, if all cells are out of range, then no measurements are reported to the network.

If the criterion for sending a RSRP measurement to the network is not met, then no measurements are reported to the network, and the method ends, at 514.

When the network (e.g. the eNodeB in the current cell) directs the UE modem to initiate handover to the cell reported to the network, then the modem uses the computed RTD value for that cell to initialise the timing advance offset used in the PRACH procedure.

Although the above implementations have been described with reference to air-to-ground communications, it will be appreciated that these implementations are also applicable to other forms of communication between a UE modem and a base station, including the examples given above.

The methods described above may be implemented in hardware or software. When implemented in software, the described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

The methods described above can be implemented without any modification to the physical infrastructure used for communications between a modem and an eNodeB.

The singular terms "a" and "an" should not be taken to mean "one and only one". Rather, they should be taken to mean "at least one" or "one or more" unless stated otherwise. The word "comprising" and its derivatives including "comprises" and "comprise" include each of the stated features, but does not exclude the inclusion of one or more further features.

The above implementations have been described by way of example only, and the described implementations are to be considered in all respects only as illustrative and not restrictive. It will be appreciated that variations of the described implementations may be made without departing from the scope of the invention. It will also be apparent that there are many variations that have not been described, but that fall within the scope of the appended claims.

The invention claimed is:

1. A method of selecting a cell for air-to-ground communication over a network, the method comprising:
   determining a round trip delay (RTD) measurement from an airborne device to each of a plurality of base stations, each of the plurality of base stations being in a respective one of a plurality of cells;
   ranking the plurality of cells based at least in part on the RTD measurements;
   selecting the highest-ranked cell; and
   initiating attachment to the selected cell;
   the method further comprising:
   initiating attachment to an initial cell of the plurality of cells prior to determining the RTD from the airborne device to the plurality of base stations, wherein initiating attachment to the initial cell comprises:
   transmitting a first preamble from the airborne device to the base station in the initial cell, wherein the first preamble is transmitted with a first timing advance offset;
   storing the first timing advance offset;
   determining whether a response is received at the airborne device from the base station in the initial cell;
   transmitting a connection request to the base station in the initial cell if a response is received from the base station in the initial cell;
   determining whether an acknowledgement of the connection request is received at the airborne device from the base station in the initial cell; and
   if it is determined that no acknowledgement of the connection request is received at the airborne device from the base station in the initial cell, transmitting a second preamble from the airborne device to the base station in the initial cell, wherein the second preamble is transmitted with a second timing advance offset based on the stored timing advance offset.

2. A method according to claim 1, wherein a distance from the airborne device to each of the plurality of base stations exceeds a maximum distance associated with a Physical Random Access Channel (PRACH) preamble.

3. A method according to claim 1, further comprising:
determining whether the selected cell is an initial cell to which the airborne device is attached; and
remaining attached to the initial cell if the selected cell is the initial cell.

4. A method according to claim 1, wherein the cells are ranked based at least in part on measurements of the received power of reference signals transmitted by the plurality of base stations.

5. A method according to claim 1, wherein the cells are ranked based at least in part on measurements of the signal-to-noise ratio or carrier to interference plus noise ratio of reference signals transmitted by the plurality of base stations.

6. A method according to claim 1, wherein the first timing advance offset and the second timing advance offset are each part of a sequence of timing advance offsets, wherein the second timing advance offset is subsequent to the first timing advance offset in the sequence of timing advance offsets.

7. A method according to claim 1, further comprising:
determining that the airborne device has not attached to the initial cell; and
incrementing a fail counter for the initial cell.

8. A method according to claim 7, wherein determining that the airborne device has not attached to the initial cell comprises:
determining that preambles corresponding to a range of a modem of the airborne device have been transmitted from the airborne device to the base station in the initial cell; and/or
determining that an acknowledgement of a connection request transmitted from the airborne device to the base station in the initial cell has not been received at the airborne device.

9. A method according to claim 7, further comprising:
determining that the fail counter for the initial cell is not less than the failure threshold; and
blocking the initial cell for a predetermined time period.

10. A method of handover of an airborne user equipment (UE) device from a first cell in an air-to-ground communications network to a second cell in the network, the method comprising:
determining a round trip delay (RTD) measurement from the airborne device to each of a plurality of base stations, each of the plurality of base stations being in a respective one of a plurality of cells;
removing a cell from a list of available cells if the RTD measurement from the airborne device to the respective base station in the cell exceeds the range of a modem of the airborne device;
ranking the plurality of cells based at least in part on the RTD measurements, wherein ranking the plurality of cells comprises ranking the list of available cells;
selecting the highest-ranked cell; and
reporting details of the selected cell to the network.

11. A method according to claim 10, wherein a distance from the airborne device to each of the plurality of base stations exceeds a maximum distance associated with a Physical Random Access Channel (PRACH) preamble.

12. A method according to claim 10, wherein the cells are ranked based at least in part on:
measurements of the received power of reference signals transmitted by the plurality of base stations; and/or
measurements of the signal-to-noise ratio of reference signals transmitted by the plurality of base stations; and/or
measurements of the carrier to interference plus noise ratio of reference signals transmitted by the plurality of base stations.

13. A method according to claim 10, further comprising initiating attachment to the selected cell by transmitting a preamble from the airborne device to the selected cell, wherein the preamble is transmitted with a timing advance offset based on the determined RTD measurement from the airborne device to the base station in the selected cell.

14. A method according to claim 10, further comprising blocking the reporting of details of cells ranked below the highest-ranked cell to the network.

15. A non-transitory computer-readable medium comprising instructions that, when executed by a processor of a device, cause the device to perform a method according to claim 1.

16. A non-transitory computer-readable medium comprising instructions that, when executed by a processor of a device, cause the device to perform a method according to claim 10.

* * * * *